United States Patent [19]

Hallwirth et al.

[11] Patent Number: 5,461,581
[45] Date of Patent: Oct. 24, 1995

[54] STORED-PROGRAM CONTROLLED PROCESSOR

[75] Inventors: Volker Hallwirth, St. Georgen; Gerhard Hinsken, Offenburg, both of Germany

[73] Assignee: Siemens Aktiengesellschaft, München, Germany

[21] Appl. No.: 240,741

[22] PCT Filed: Nov. 2, 1992

[86] PCT No.: PCT/DE92/00916

§ 371 Date: Jun. 20, 1994

§ 102(e) Date: Jun. 20, 1994

[87] PCT Pub. No.: WO93/10487

PCT Pub. Date: May 27, 1993

[30] Foreign Application Priority Data

Nov. 11, 1991 [DE] Germany ............... 41 37 033.3

[51] Int. Cl.$^6$ .................................................. G05B 19/02
[52] U.S. Cl. .................. 364/580; 364/259.2; 371/31; 371/67.1
[58] Field of Search .................. 364/580, 769, 364/247.3, 259.2, 736.5, 947.2; 371/31, 67.1; 340/146.2

[56] References Cited

FOREIGN PATENT DOCUMENTS

| 0174230 | 3/1986 | European Pat. Off. . |
| WOA8810471 | 12/1988 | WIPO . |
| WOA8902099 | 3/1989 | WIPO . |

*Primary Examiner*—Emanuel T. Voeltz
*Assistant Examiner*—Craig Steven Miller
*Attorney, Agent, or Firm*—Kenyon & Kenyon

[57] ABSTRACT

A programmable controller having a word processor for word processing operations and a bit processor for bit processing operations. The bit processor has a first flag register and a second flag register which permit the comparison of the results of word processing operations with the results of the preceding bit processing operations to be simplified.

6 Claims, 2 Drawing Sheets

| | FL1 | FL2 |
|---|---|---|
| UE1.0 | + | = |
| UE2.0 | + | = |
| LEW1 | − | − |
| LEW2 | − | − |
| !F | + | − |
| UFL2 | + | − |
| =A1.0 | − | − |

STORED-PROGRAM CONTROLLED PROCESSOR

BACKGROUND OF THE INVENTION

The present invention relates to a stored-program control.

The PCT Publication No. WO 88/10471 describes a programmable controller, which has at least one command storage unit, in which commands for operating programmable controller are stored. The storage unit is linked, via at least one bus system, to a word processor for word processing operations and to a bit processor for bit processing operations. By means of this programmable controller, the results of an analog-signal processing are preprocessed thereby permitting them to be received by the bit processor for the bit processing operation. For this purpose, a decoder is provided, which has inputs connected to the storage unit and to a flag register of the word processor and outputs connected to the bit processor. In each case, the decoder produces a status bit in the form of a binary identifying signal from its input signals, formed from the usual flag signals together with the commands producing the flag signals. The binary identifying signal is sampled by the bit processor through a command assigned to it and stored in the command storage unit at the output of the decoder. By means of this control provided with circuit-engineering measures, combining a word-processing result with the result of the preceding binary processing is possible.

Chapter 2 of the publication Automatisieren mit SIMATIC S5–115U [Automating with SIMATIC S5–115U] by Hans Berger, 1991, ("the Berger article") describes that a result of a binary logic operation (BLO) is stored in the bit processor and is available for further processing. If a statement list consists of several consecutive binary logic instructions, then these are processed in sequence by the bit processor. The result of a logic operation is initially stored in the bit processor and linked with the sampling result of the next instruction, etc. The logic result stored in the flag register of the bit processor prior to the processing of the next instruction is erased after this instruction is processed and replaced by the new logic result.

Chapter 3 of the Berger article describes, on page 108, the processing of a so-called comparison operation. In the comparison operation, two digital values are compared to one another. The result of this processing influences the binary logic result, which means that the previous content of the flag register of the bit processor is altered and is no longer available for a further processing. This previous content of the flag register can be "saved", if it had been previously stored in a special storage area (marker) on the central processing unit. It is possible, using an appropriate program, to read out this storage area and to make the content available for a further processing. However, these measures adversely affect the processing speed during operation of the stored-program control.

The object of the present invention is to create a stored programmable controller which will simplify linking the results of one word processing operation with the results of the preceding binary processing operation.

SUMMARY OF THE INVENTION

The present invention solves the above mentioned object by providing a stored programmable controller having the following features:

at least one command storage unit is provided, which is connected, via at least one bus system, to a word processor and to a bit processor, and which stores commands for the operation of the stored-programmable controller;

a word processor is provided for word processing operations and a bit processor is provided for bit processing operations;

the bit processor has a first flag register which stores the binary logic result of a binary logic operation, and a second flag register which stores the binary logic result in instances where the bit processor or word processor is processing a first command provided for this purpose and stored in the command storage unit;

with a second command stored in the command storage unit, the bit processor or word processor reads out the second flag register and processes the logic result.

In one preferred specific embodiment of the present invention in which the first command is a first binary logic command to be processed by the bit processor, the logic result is stored in the second flag register through the processing of binary logic instructions of the bit processor that are known.

DETAILED DESCRIPTION

Figure 1:
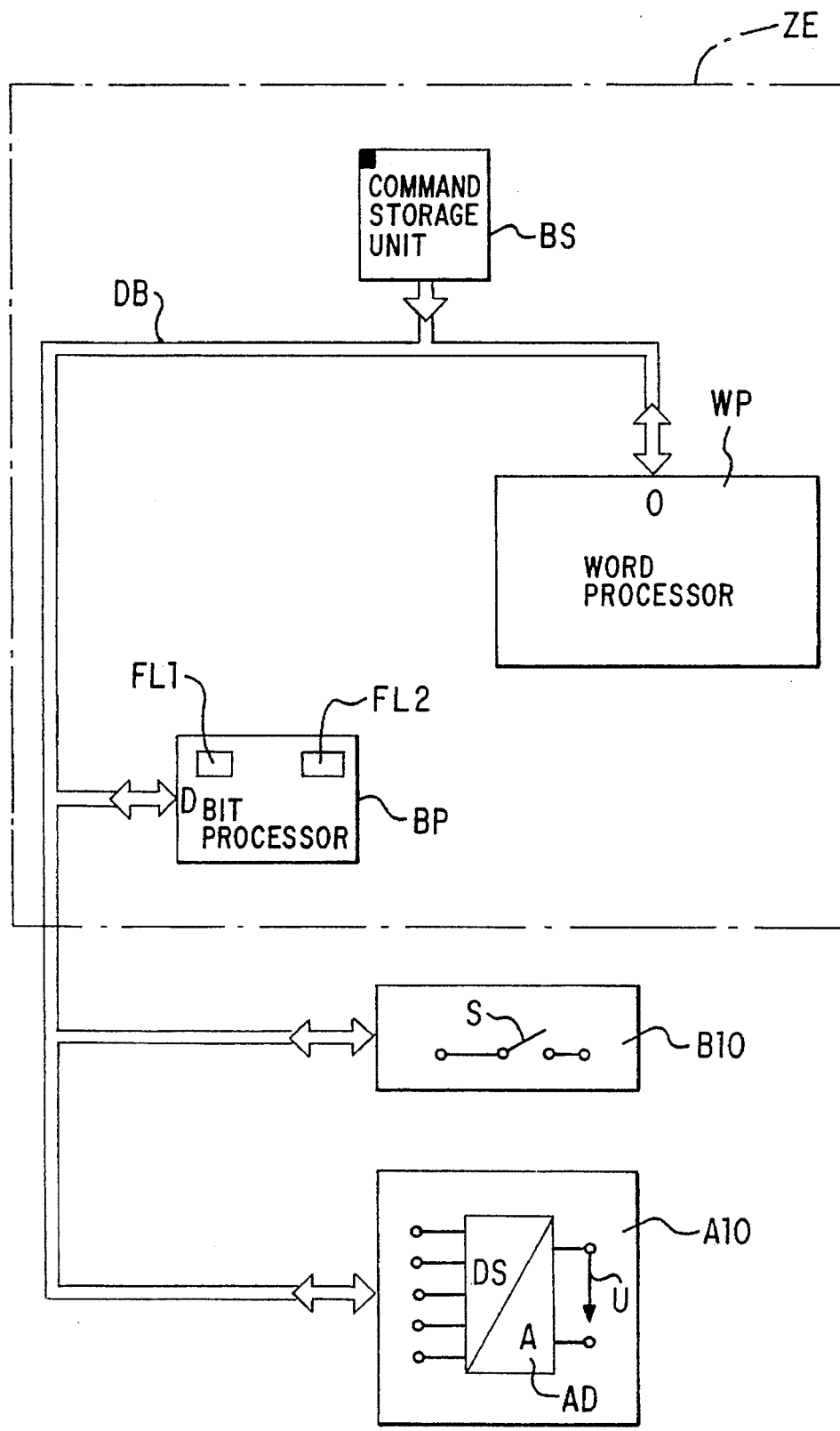
FIG. 1 is a block diagram of a stored-program control of the present invention.

FIG. 1 shows the individual elements of a programmable controller in the form of a block diagram. The programmable controller includes a central processing unit ZE, which is outlined in the drawing by a dotted line. The processing unit ZE is linked, via a shared data bus DB, to binary-signal input/output modules BIO and to an analog-value input-output module AIO. The central processing unit ZE includes a command storage unit BS, a word processor WP, and a bit processor BP. The bit processor BP is provided with a first flag register FL1 and a second flag register FL1, FL2. The processors WP, BP and the command storage unit BS are coupled by means of the shared data bus DB. The direction of data flow on the shared data bus DB, as is customary in bus systems, is characterized by arrows. The data connections D of the word processor WP and the data connections D of the bit processor BP are directly connected to the data bus DB.

Switches S are provided as elements that produce binary signals in the binary signal input/output modules BIO. The analog-value input/output module AIO contains and an analog-digital converter AD, whose analog-signal input A is linked to a voltage source (voltage U indicated by arrow).

For the sake of clarity, decoding elements, which reduce the word length of the data bus DB for the bit processor BP, are not shown. The same applies to a shared address bus system and to a program counter, with which the command storage unit BS can be addressed by the word processor WP and/or by the bit processor BP and through which the corresponding input/output modules can be addressed by the processors WP, BP.

The command storage unit BS can be a conventional storage module whose word length is adapted to the requirements of the word processor WP or of the bit processor BP. The word processor WP can be a conventional site microprocessor, as known, for example, from the description SIMATIC S5 Automatisierungsgerät S5–135 [SIMATIC S5 Programmable Controller], edition 5, 1990.

The bit processor BP can be a dedicated binary logic device, and in particular, can be a sequential circuit for customer applications. However, a modified binary logic device, which would have to be altered to include a second flag register FL2 in addition to the first flag register FL1, can also be used. The switches S of the binary input/output modules BIO can be mechanical, electromechanical or electronic. An ordinary analog-digital converter AD, for example, can be used for the analog-value input-output module AIO.

By means of the binary input/output modules BIO, the switch positions of the switch S in question are sampled or altered. The analog input/output module AIO is used for inputting and outputting digitized analog signals, which are described in the following as "analog values". The drawing depicts the inputting of analog values, which are produced by an analog-digital converter AD, whose digital signal output DS is connected to the data bus DB. The width of the data bus DB is essentially determined by the word length of the word processor WP. Customary word lengths are, for example, 8 bits, 16 bits or 32 bits. By means of the analog-digital converter AD, for example, a voltage U, which is applied to the analog-signal input A of the analog-digital converter AD, is converted into a digital value, which is sampled by the word processor WP via the data bus DB.

During the control process, the commands which are filed in the command storage unit BS and which are specified by the control program, are read out and fed via the data bus DB to the word processor WP and to the bit processor BP. As is customary under existing prior art, the processors WP, BP recognize which commands are designated for them, based on the structure of the commands. To execute the commands, both processors WP and BP communicate, via the data bus DB, with the peripheral input/output module AIO, BIO responsible for them. The bit processor BP is responsible in this case for the binary input/output module BIO, and the word processor WP for the analog-value input/output module AIO.

The bit processor BP can execute binary functions, as disclosed, for example, by the Berger article. Results of a binary logic operation are output to the binary input/output modules BIO where the results effect the appropriate switch (transistor) positions (in some instances also valve positions, etc.). Usually, in industrial control systems, the interrogation of all relevant binary and switching elements of the technical device by the bit processor BP will be preceded by a change in a switch (transistor) or valve position.

The word processor WP can likewise communicate with the analog input/output module AIO assigned to it. The word processor processes, for example, digital functions, which are likewise described in the Berger article.

Figures 2A, 2B:
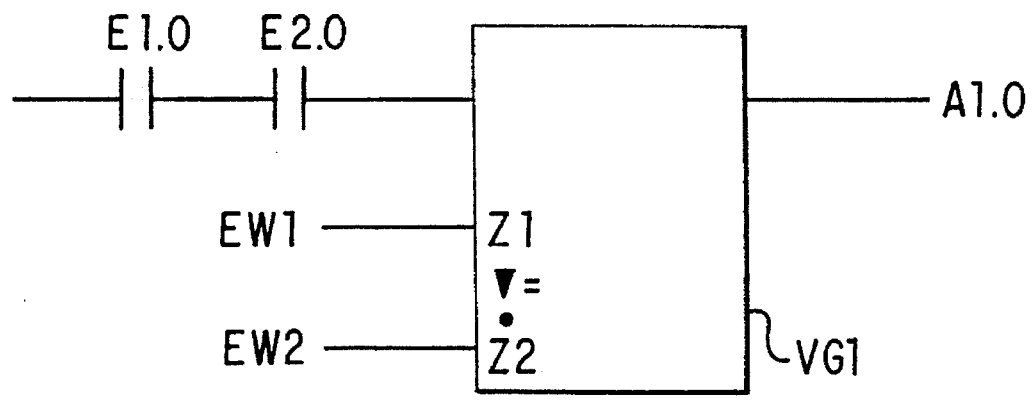
FIG. 2a is a ladder diagram which illustrates control instructions for a stored-program control and FIG. 2b is a statement list which illustrates control instructions for a stored-program control.

To clarify a simple logic operation between a result of a word processing with a result of a preceding binary processing, FIGS. 2a and 2b show control statements (embedded commands) of a stored-program control, FIG. 2a illustrating the control statements in a generally known ladder diagram, and FIG. 2b illustrating the control statements in a known statement list.

The equivalent parts in FIGS. 1, 2a and 2b are given the same reference numerals. E1.0 and E2.0 signify binary signals of the binary input/output modules BIO. EW1 and EW2 signify analog values of the analog-value input/output module AIO. A1.0 signifies an output signal that the bit processor BP injects into one of the binary input/output modules BIO.

In FIG. 2b "U" denotes an AND operation. "L" denotes an operation in which a value is loaded. "!F" denotes a comparison operation, which compares two values at the inputs Z1, Z2 of a comparator VG. The control program initially specifies sampling the signals E1.0 and E2.0 of the binary input/output modules BIO in series and to link the result of the sampling to an AND gate. The previous content of the first flag register FL1 and the result of this binary processing is stored in the flag register FL1.

The symbol "+" in FIG. 2b signifies that an operation that had just been performed alters the content of this flag register. In the example shown, the content of the flag register FL2 corresponds, in the case of binary logic operations, to the content of the first flag register FL1, and is represented in FIG. 2b by the symbol "=". After this binary logic operation, the analog values EW1 and EW2 of the analog-value input/output module are loaded into accumulators (not shown here) of the word processor WP in accordance with the requirements of the control program, and tested for equality (i.e., compared) by the instruction ∂!F". The load instructions do not influence the flag registers FL 1, FL2 and are characterized in FIG. 2b by "–". However, the content of the flag register FL1 is altered in accordance with the comparison result. The result of this comparison is binary, the comparison indicated as being fulfilled when the content is "1", and the comparison indicated as not being fulfilled when the content is "0". The result of this word processing, thus the comparison result, is now combined with the result of the preceding binary processing, in that the bit processor BP initially reads out and then combines or links the contents of the two flag registers FL1, FL2 based on the instruction UFL2 in the control program. The result of this logic operation resides in the first flag register FL1, and a signal A1.0 corresponding to this content is supplied, via the data bus DB, to one of the binary input/output modules BIO.

It is not absolutely necessary for the bit processor BP to effect the logic operation of the two results of the binary and word processing, rather it is also possible to design the word processor to carry out the processing itself.

In the indicated example, the binary logic operation combining the signals E1.0 and E2.0 influences the contents of both the first and the second flag registers FL1 and FL2. It is, of course, possible to design the bit processor and/or the word processor to, itself/themselves, influence the second flag register FL2 in the case of other commands, as well, such as jump or storage commands, and with these commands, to transfer the content of the first flag register, which is the current content before these commands are executed, into the second flag register.

We claim:

1. A programmable processor comprising:

a) a command storage unit which stores commands for the operation of the programmable controller;

b) a word processor for word processing operations;

c) a bit processor
  i) for bit processing operations, and
  ii) having a first flag register which stores a binary logic result of a binary logic operation and second flag register which stores the binary logic result stored in said first flag register when one of said bit processor and said word processor is processing a first command provided for this purpose and stored in said command storage unit, wherein a second command stored in said command storage unit directs one of said bit processor and said word processor to read out a content of said second flag register and process the logic result.

2. The programmable processor of claim 1 wherein said first command is a first binary logic-operation command to be processed by said bit processor.

3. The programmable processor of claim 1 wherein said first command is a storage command to be processed by said word processor.

4. The programmable processor of claim 1 wherein said first command is a jump command to be processed by said word processor.

5. The programmable processor of claim 1 wherein said second command is a second logic-operation command to be processed by said bit processor.

6. The programmable processor of claim 1 wherein said second command is a second binary logic-operation command to be processed by said word processor.

* * * * *